United States Patent [19]

Kurakake

[11] Patent Number: 4,904,915
[45] Date of Patent: Feb. 27, 1990

[54] VELOCITY CONTROL APPARATUS

[75] Inventor: Mitsuo Kurakake, Hino, Japan

[73] Assignee: Fanuc Ltd., Minamitsuru, Japan

[21] Appl. No.: 251,378

[22] PCT Filed: Jan. 29, 1988

[86] PCT No.: PCT/JP88/00082

§ 371 Date: Sep. 13, 1988

§ 102(e) Date: Sep. 13, 1988

[87] PCT Pub. No.: WO88/05977

PCT Pub. Date: Aug. 11, 1988

[30] Foreign Application Priority Data

Jan. 29, 1987 [JP] Japan .................. 62-019385

[51] Int. Cl.$^4$ .................................. G05B 13/00
[52] U.S. Cl. .................. 318/568.22; 318/615;
318/618; 318/632; 318/568.24; 364/513;
901/23
[58] Field of Search ............... 318/614, 615, 616, 617,
318/618, 611, 632, 563, 564, 565, 566, 567, 568
R, 568 I, 568 L, 568 M, 571, 572, 573, 574, 628;
901/9, 10, 19, 20, 21, 23, 24, 46

[56] References Cited

U.S. PATENT DOCUMENTS

| | | | |
|---|---|---|---|
| 3,845,284 | 10/1974 | Taguchi et al. | 318/567 |
| 4,156,835 | 5/1979 | Whitney et al. | 364/513 X |
| 4,243,923 | 1/1981 | Whitney et al. | 364/513 X |
| 4,331,910 | 5/1982 | Kohzai et al. | 318/618 |
| 4,507,594 | 3/1985 | Takemoto | 318/615 |
| 4,535,277 | 8/1985 | Kurakake | 318/615 X |
| 4,547,858 | 10/1985 | Horak | 364/513 |
| 4,587,469 | 5/1986 | Ikebe et al. | 318/632 X |
| 4,603,284 | 7/1986 | Perzley | 318/632 X |
| 4,621,332 | 11/1986 | Sugimoto et al. | 364/513 |
| 4,665,352 | 5/1987 | Bartelt et al. | 318/568 |
| 4,680,518 | 7/1987 | Kurakake et al. | 318/615 X |
| 4,695,780 | 9/1987 | Kurakake et al. | 318/615 X |
| 4,788,482 | 11/1988 | Tachibana et al. | 318/616 |

Primary Examiner—William M. Shoop, Jr.
Assistant Examiner—Paul Ip
Attorney, Agent, or Firm—Staas & Halsey

[57] ABSTRACT

A velocity control apparatus according to the present invention controls the velocity of the distal end of a load such as a robot upon estimating the velocity of a servomotor from a detected position signal. In order to raise the speed at which estimated values of position and velocity are computed by an observer, a model serving as the object under the control of the observer is reconstructed as a simplfied servo-control system, and an estimated value ($\hat{V}_L$) of the velocity of the distal end of the mechanical load is computed upon regarding a difference value in the amount of rotation of the servomotor every fixed period as being the rotational velocity (V) thereof.

4 Claims, 1 Drawing Sheet

VELOCITY CONTROL APPARATUS

BACKGROUND OF THE INVENTION

1. Field of the Invention

This invention relates to a velocity control apparatus for controlling the velocity of the distal end of a load, such as the arm of a robot, by a status observing apparatus.

2. Description of the Related Art

Servomotors are used in control systems for driving various mechanical loads in machine tools and the like. In the case of a servomotor for driving a load having little rigidity such as a robot arm, it is required that velocity be controlled and not just position.

FIG. 2 is a block diagram illustrating an example of a conventional servo-control system having a mechanical load with little rigidity. A servo-controller a is included in a control system constructed such that a servomotor b and a mechanical load c are connected by a spring constant (K) d.

In FIG. 2, Kt denotes a torque constant, Jm rotor inertia, K the spring constant, $J_L$ load inertia and 1/s an integration term. In a case where the mechanical load c having little rigidity is driven by the servomotor b, a current command u(k) applied to the control system is converted into a torque command by the torque constant Kt and a deviation signal between this torque command and an actual torque value is applied to the servomotor b as a command. This deviation signal is converted into an acceleration command by the rotor inertia term Jm, and this command is passed through the integration term once to obtain a motor velocity command signal V for driving and controlling the servomotor b to indirectly control the mechanical load c.

The motor velocity command signal V is passed through the integration term to obtain a position command signal $\theta$, which is used to determine velocity $V_L$ and position $\theta_L$ for the mechanical load c. Connected to an output shaft of the servomotor b is a rotary encoder e or the like for detecting, as a command signal y, the commanded position of the mechanical load c commanded by the servomotor b.

The operating states of the servomotor b and mechanical load c constituting the actual control system as an actuator cannot be fed back to the servocontroller upon measuring all of the variables thereof on-line. Accordingly, the necessary status data regarding the object under control must be estimated upon stipulating the state of the control system based solely on utilizable data from the rotary encoder e or the like. It is therefore necessary to detect the motor velocity command signal V, the actual velocity $V_L$ at the distal end of the mechanical load and control velocity in dependence upon the deviation with respect to the command signal V. In general, a sensor for detecting the velocity $V_L$ of the mechanical load c is high in cost and is difficult to mount on every axis of a robot. For these reasons, velocity control in the servo-control system shown in FIG. 2 is performed by estimating velocity by means of an observer (status observing device).

In cases where status variables cannot be measured directly, the status variables are reproduced by the observer from a control input and a measurement output. However, in the foregoing servo-control system, the estimated value of velocity based on the servomotor b and the position of the distal end of the mechanical load c are computed and discrete value control is carried out by a microprocessor (now shown). The following computation equations serve as a basis for estimated values $\hat{\theta}$, $\hat{V}$ of position and velocity of the motor and estimated values $\hat{\theta}_L$, $\hat{V}_L$ of the position and velocity of the load used in this computation:

$$\hat{\theta}(K+1) = (1-K1)\{0_{11}\hat{\theta}(k) + 0_{12}\hat{V}(K) + 0_{13}\hat{\theta}_L(K) + 0_{14}\hat{V}_L(K) + h_1 u(K)\} + K_{1y}(K+1) \quad (1)$$

$$\hat{V}(K+1) = (0_{21} - K_2 0_{11})\hat{\theta}(K) + (0_{22}31\ K_2 0_{12})\hat{V}(K) + (0_{23}31\ K_2 0_{13})\hat{\theta}_L(k) + (0_{24} - K_2 0_{.14})\hat{V}_L(K) + (h_2 - K_2 H_1)U(K) + K_{2y}(K+1) \quad (2)$$

$$\hat{\theta}(K+1) = (0_{31} - K_3 0_{11})\hat{\theta}(K) + (0_{32} - K_3 0_{12})\hat{V}(K) + (0_{23} - K_3 0_{13})\hat{\theta}_L(K) + (0_{34} - K_3 0_{14})\hat{V}_L(K) + (h_3 - K_3 h_1)U(K) + K_{3y}(K+1) \quad (3)$$

$$\hat{V}_L(K+1) = (0_{41} - K_4 0_{11})\hat{\theta}(K) + (0_{42} - K_4 0_{12})\hat{V}(K) + (0_{43} - K_4 0_{13})\hat{\theta}_L(K) + (0_{44} - K_4 0_{14})\hat{V}_L(K) + (h_4 - k_4 h_1)U(K) + k_{4y}(K+1) \quad (4)$$

where $K_1$–$K_4$ are the gains of the observer.

A differential equation [Eq. (7)] regarding a status matrix $X(k)$ of a discrete value system is expressed as follows:

$$\Phi = \begin{pmatrix} \phi_{11}, \phi_{12}, \phi_{13}\phi_{14} \\ \phi_{21}, \phi_{22}, \phi_{23}, \phi_{24} \\ \phi_{31}, \phi_{32}, \phi_{33}, \phi_{34} \\ \phi_{41}, \phi_{42}, \phi_{43}, \phi_{44} \end{pmatrix} \quad (5)$$

$$\Gamma = \begin{pmatrix} h_1 \\ h_2 \\ h_3 \\ h_4 \end{pmatrix} \quad (6)$$

$$X(k+1) = \Phi X(K) + \Gamma u(K) \quad (7)$$

$$X^T(k) = [\theta(K), V(K), \theta L(K), VL(K)] \quad (8)$$

However, in order to obtain the estimated values of motor position and velocity as well as of the position and velocity of the distal end of the mechanical load with the observer in the servo-control system shown in FIG. 2, it is required that multiplication processing be performed a large number of times, as indicated by the Eqs. (1)–(4). In other words, processing regarding the coefficient matrix performed by the microprocessor requires a long period of time and the velocity of the distal end of a robot arm cannot be accurately controlled.

SUMMARY OF THE INVENTION

The present invention has been devised to solve the aforementioned problems and its object is to provide a velocity control apparatus capable of simply computing estimated values of motor velocity and the velocity of the distal end of a mechanical load by improving upon the construction of an observer.

In accordance with the invention, there is provided a velocity control apparatus for estimating velocity of a motor from a detected position signal and controlling travelling velocity of a mechanical load the movement whereof is controlled by the motor, comprising a servomotor for driving the mechanical load, a servo-controller for subjecting the servomotor to discrete-value control in dependence upon a position of a distal end of the mechanical load, and an observer for computing an estimated value as a deviation between rotational velocity of the servomotor and velocity of the distal end of the mechanical load based on a difference value in an amount of rotation of the servomotor every fixed period.

Thus, the velocity control apparatus of the present invention is such that, with regard to a servo system for driving and controlling a load with little rigidity such as a robot arm by a servomotor, a difference value every fixed period of a number of pulses from a rotary encoder mounted on a shaft of the servomotor is regarded as motor rotational velocity inclusive of detection noise, and accurate velocity control can be realized in which computations for estimating the velocity of the motor and of the distal end of the mechanical load are carried out in a short period of time.

DESCRIPTION OF THE PREFERRED EMBODIMENT

An embodiment of the present invention will now be described in detail with reference to the drawings.

Figure 1:
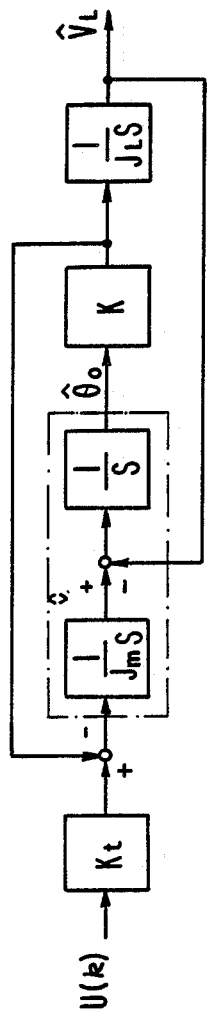
FIG. 1 is a block diagram illustrating an embodiment of a servo-control system according to the present invention.
Figure 2:
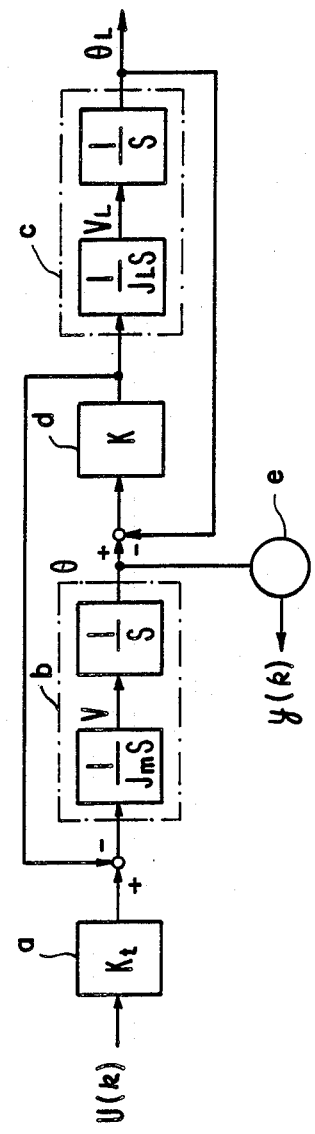
FIG. 2 is a block diagram illustrating an example of a conventional servo-control system.

FIG. 1 is a block diagram in which a model serving as the object of control of an observer according to the invention is reconstructed by a simplified servocontrol system. A characterizing feature of this simplified model is that status variables are reduced by one by obtaining a deviation between the velocity $V_L$ of the distal end of the mechanical load in FIG. 2 and the velocity V of the servomotor from an actual servocontrol system. In other words, discrete-value control by microprocessor is carried out by a computing a difference value in the amount of rotation of the servomotor b every fixed period from the detection value y of the rotary encoder e, which is mounted on the shaft of the servomotor b, in accordance with $$\Delta y(K) = \{y(K) - y(K-1)\}/T \quad (9)$$

where T is the sampling period, regarding this difference value as an estimated value $\hat{V}$ of motor rotational velocity inclusive of detection noise, and estimating motor velocity $\hat{V}$ and mechanical load velocity $\hat{V}_L$, which noise has been removed, by the above-mentioned observer.

The estimated values $\hat{V}$ and $\hat{\theta}_0$ of motor velocity and position and the estimated value $\hat{V}_L$ of the velocity of the distal end of the mechanical load at this time are expressed as follows, in which it is unnecessary to estimate the position $\theta_L$ of the distal end of the machine:

$$\hat{V}(K+1) = (1-K_1)\{0_{11}\hat{V}(K) + 0_{12}\hat{\theta}_0(K) + 0_{13}\hat{V}_L(K) + h_1 u(K)\} + K_1 \Delta y(K+1) \quad (10)$$

$$\hat{\theta}_0(k+1) = (0_{21} - K_2 0_{11})\hat{V}(K) + (0_{22} - K_2 0_{12})\hat{\theta}_0(K) + (0_{23} - K_2 0_{13})\hat{V}_L(K) + (h_2 - K_2 h_1)U(K) + K_2 \Delta y(k+1) \quad (11)$$

$$\hat{V}_L(K+1) = (0_{31} - K_3 0_{11})\hat{V}(K) + (0_{32} - K_3 0_{12})\hat{\theta}_0(K) + (0_{33} - K_3 0_{13})\hat{V}_L(K) + (h_3 - k_3 h_1)U(K) + k_3 \Delta y(K+1) \quad (12)$$

where K1–K3 are the gains of the observer and the status matrix of the discrete value system is expressed by Eqs. (13)–(16).

$$\Phi = \begin{pmatrix} \phi_{11}, \phi_{12}, \phi_{13} \\ \phi_{21}, \phi_{22}, \phi_{23} \\ \phi_{31}, \phi_{32}, \phi_{33} \end{pmatrix} \quad (13)$$

$$\Gamma = \begin{pmatrix} h_1 \\ h_2 \\ h_3 \end{pmatrix} \quad (14)$$

$$X(K+1) = \Phi X(K) + \Gamma u(K) \quad (15)$$

$$X'(K) = [V(K), \theta_0(K), V_L(K)] \quad (16)$$

Originally, velocity control would be performed upon evaluating a matricial equation of four rows and four columns. Here, however, control is possible by evaluating a matricial equation of three rows and three columns. As a result, microprocessor processing time is shortened and predetermined velocity control can be carried out upon obtaining the rotational velocity, from which noise has been removed, of the motor and of the distal end of the mechanical load.

Though an embodiment of the present invention has been described, the invention is not limited thereto but can be modified in various ways without departing from the scope of the claims.

The velocity control apparatus of the present invention is capable of carrying out optimum control by estimating undetectable physical quantities when driving, by means of a servomotor or the like, a mechanical load having little rigidity.

What is claimed is:

1. A velocity control apparatus for estimating velocity of a motor from a detected position signal and controlling a travelling velocity of a mechanical load the movement whereof is controlled by the motor, said velocity control apparatus comprising:
   a servomotor for driving the mechanical load;
   a servo-controller, operatively connected to said servomotor, for subjecting the servomotor to discrete-value control in dependence upon a position of a distal end of the mechanical load; and
   observer means for computing an estimated value as a deviation between rotational velocity of said servomotor and velocity of the distal end of the mechanical load based on a difference value in an amount of rotation of said servomotor every fixed period.

2. A velocity control apparatus according to claim 1, wherein said observer means considers the difference value in the amount of rotation of said servomotor every fixed period as being the rotational velocity of the servomotor inclusive of noise, and estimates a commanded velocity of the servomotor and the velocity of the distal end of the mechanical load.

3. The velocity control apparatus according to claim 2, wherein the mechanical load is a robot arm driven and controlled by a plurality of servomotors.

4. The velocity control apparatus according to claim 2,
   wherein said servomotor has a spindle and a pulse encoder for detecting rotational speed of the spindle, and
   wherein discrete-value control is carried out by feeding back pulses from the pulse encoder with a predetermined period between pulses.

* * * * *

UNITED STATES PATENT AND TRADEMARK OFFICE
CERTIFICATE OF CORRECTION

PATENT NO. : 4,904,915
DATED : February 27, 1990
INVENTOR(S) : Kurakake

It is certified that error appears in the above-identified patent and that said Letters Patent is hereby corrected as shown below:

Col. 2, Equation (1) should be $$--\hat{\theta}(K+1) = (1-K_1)\{\phi_{11}\hat{\theta}(K) + \phi_{12}\hat{V}(K) + \phi_{13}\hat{\theta}_L(K)$$
$$+ \phi_{14}\hat{V}_L(K) + h_1 u(K)\} + K_1 y(K+1) --;$$

Col. 2, Equation (2) should be $$--\hat{V}(K+1) = (\phi_{21} - K_2\phi_{11})\hat{\theta}(K) + (\phi_{22} - K_2\phi_{12})\hat{V}(K) +$$
$$(\phi_{23} - K_2\phi_{13})\hat{\theta}_L(K) + (\phi_{24} - K_2\phi_{14})\hat{V}_L(K) +$$
$$(h_2 - K_2 h_1)u(K) + K_2 y(K+1) --;$$

Col 2, Equation (3) should be $$--\hat{\theta}_L(K+1) = (\theta_{31} - K_3\phi_{11})\hat{\theta}(K) + (\phi_{32} - K_3\phi_{12})\hat{V}(K) +$$
$$(\phi_{33} - K_3\phi_{13})\hat{\theta}_L(K) + (\phi_{34} - K_3\phi_{14})\hat{V}_L(K) +$$
$$(h_3 - K_3 h_1)u(K) + K_3 y(K+1) --;$$

UNITED STATES PATENT AND TRADEMARK OFFICE
CERTIFICATE OF CORRECTION

PATENT NO. : 4,904,915
DATED : February 27, 1990
INVENTOR(S) : Kurakake

It is certified that error appears in the above-identified patent and that said Letters Patent is hereby corrected as shown below:

Col 2, Equation (4) should be $$--\hat{V}_L(K+1) = (\phi_{41}-K_4\phi_{11})\hat{\theta}(K) + (\phi_{42}-K_4\phi_{12})\hat{V}(K) +$$
$$(\phi_{43}-K_4\phi_{13})\hat{\theta}_L(K) + (\phi_{44}-K_4\phi_{14})\hat{V}_L(K) +$$
$$(h_4-K_4h_1)u(K) + K_4y(K+1) --;$$

Col 2, Equation (8) should be $$--X'(K) = [\theta(K), V(K), \theta_L(K), V_L(K)]--;$$

Col. 3, line 40, after "by" delete "a", and before "microprocessor" insert --a--;

Col. 3, line 46, Equation (9) should be $$--\Delta y(K) = \{y(K)-y(K-1)\}/T--;$$

Col. 3, line 53, before "which" insert --from--;

Col. 3, Equation (10) should be $$--\hat{V}(K+1) = (1-K_1)\{\phi_{11}\hat{V}(K)+\phi_{12}\hat{\theta}_o(K)+$$
$$\phi_{13}\hat{V}_L(K)+h_1u(K)\}+K_1\Delta y(K+1)--;$$

UNITED STATES PATENT AND TRADEMARK OFFICE
CERTIFICATE OF CORRECTION

PATENT NO. : 4,904,915

DATED : February 27, 1990

INVENTOR(S) : Kurakake

It is certified that error appears in the above-identified patent and that said Letters Patent is hereby corrected as shown below:

Col. 3, Equation (11) should be $$--\hat{\theta}_o(K+1) = (\phi_{21} - K_2\phi_{11})\hat{V}(K) + (\phi_{22} - K_2\phi_{12})\hat{\theta}_o(K)$$
$$+ (\phi_{23} - K_2\phi_{13})\hat{V}_L(K) + (h_2 - K_2h_1)u(K)$$
$$+ K_2\Delta y(K+1) --;$$

Col. 3, Equation (12) should be $$--\hat{V}_L(K+1) = (\phi_{31} - K_3\phi_{11})\hat{V}(K) + (\phi_{32} - K_3\phi_{12})\hat{\theta}_o(K)$$
$$+ (\phi_{33} - K_3\phi_{13})\hat{V}_L(K) + (h_3 - K_3h_1)u(K)$$
$$+ K_3\Delta y(K+1) --.$$

Signed and Sealed this

Twenty-fourth Day of December, 1991

*Attest:*

HARRY F. MANBECK, JR.

*Attesting Officer*  *Commissioner of Patents and Trademarks*